(12) United States Patent
Czechtizky et al.

(10) Patent No.: US 8,490,508 B2
(45) Date of Patent: Jul. 23, 2013

(54) FOLDING-TOP DRIVE

(75) Inventors: Timo Czechtizky, Zell u.A. (DE); Horst Schmidt, Stuttgart (DE); Holger Engbers, Hoogstede (DE)

(73) Assignees: Dr. Ing. H.C.F. Porsche Aktiengesellschaft (DE); Magna Car Top Systems GmbH (DE)

( * ) Notice: Subject to any disclaimer, the term of this patent is extended or adjusted under 35 U.S.C. 154(b) by 302 days.

(21) Appl. No.: 12/949,186

(22) Filed: Nov. 18, 2010

(65) Prior Publication Data

US 2011/0113904 A1    May 19, 2011

(30) Foreign Application Priority Data

Nov. 18, 2009    (DE) .......................... 10 2009 053 555

(51) Int. Cl.
| | |
|---|---|
| F16H 27/02 | (2006.01) |
| F16H 29/02 | (2006.01) |
| F16H 29/20 | (2006.01) |
| F16H 57/00 | (2006.01) |
| F16H 1/16 | (2006.01) |
| F16H 1/20 | (2006.01) |

(52) U.S. Cl.
USPC ............................. 74/89.14; 74/405; 74/425

(58) Field of Classification Search
USPC ................ 74/89.14, 425, 405, 409, 440, 406, 74/421 A, 412 TA, 380, 724, 814, 89.36, 74/89.38, 411; 296/112, 113, 115, 117, 223, 296/146.4; 318/12, 15; 475/149, 263
See application file for complete search history.

(56) References Cited

U.S. PATENT DOCUMENTS

| | | | | |
|---|---|---|---|---|
| 3,116,087 | A | * | 12/1963 | Baumann ....................... 296/117 |
| 3,248,970 | A | * | 5/1966 | Pickles .......................... 74/665 F |
| 3,893,260 | A | * | 7/1975 | Cadiou ............................ 49/362 |
| 3,964,335 | A | * | 6/1976 | Gerard ............................. 74/425 |
| 4,257,285 | A | * | 3/1981 | Whitehouse et al. ........... 74/405 |
| 4,548,439 | A | * | 10/1985 | Bienert et al. ................. 296/223 |
| 4,570,504 | A | * | 2/1986 | Sitta et al. ....................... 74/411 |
| 4,712,599 | A | * | 12/1987 | Komaki ......................... 160/133 |
| 4,991,903 | A | | 2/1991 | Okabe et al. |
| 5,439,261 | A | | 8/1995 | O'Hare |

(Continued)

FOREIGN PATENT DOCUMENTS

| | | |
|---|---|---|
| DE | 38 26 411 | 3/1989 |
| DE | 43 27 781 | 3/1994 |

(Continued)

*Primary Examiner* — Troy Chambers
*Assistant Examiner* — Jakes Cook
(74) *Attorney, Agent, or Firm* — Gerald E. Hespos; Michael J. Porco; Matthew T. Hespos

(57) ABSTRACT

A folding-top drive has a motor (13) that transmits forces to a first gear (14) and then to a folding-top linkage via a second gear (15). The first gear (14) and a guide (23) are pivoted to a housing (19) and a spring (22) acts on the guide (23). The first gear is guided on the guide (23) so that the guide (23) can be moved automatically with the first gear (14) counter to the force of the spring (22) from a first position where the gears (14, 15) engage to a second position where the gears (14, 15) are disengaged if a force on the first gear exceeds a defined limit. Additionally, the spring (22) can move the guide (12) automatically with the first gear (14) from the second position to the first position if the force on the first gear falls below the defined limit.

13 Claims, 4 Drawing Sheets

U.S. PATENT DOCUMENTS

| | | | |
|---|---|---|---|
| 6,237,863 B1 * | 5/2001 | Smith | 239/722 |
| 6,299,233 B1 | 10/2001 | Mentink | |
| 6,454,344 B2 | 9/2002 | Okada et al. | |
| 7,721,616 B2 * | 5/2010 | Augustine et al. | 74/352 |
| 2006/0156846 A1 | 7/2006 | Neubauer et al. | |
| 2008/0041178 A1 * | 2/2008 | Ozsoylu et al. | 74/425 |
| 2009/0115366 A1 * | 5/2009 | Mullet et al. | 318/466 |
| 2010/0213310 A1 * | 8/2010 | Flatt et al. | 244/99.2 |

FOREIGN PATENT DOCUMENTS

| | | |
|---|---|---|
| DE | 101 08 769 | 9/2001 |
| DE | 102 17 784 | 4/2004 |
| DE | 600 04 285 | 6/2004 |

* cited by examiner

FOLDING-TOP DRIVE

CROSS REFERENCE TO RELATED APPLICATION

This application claims priority to German Patent Application No. 10 2009 053 555.1 filed on Nov. 18, 2009, the entire disclosure of which is incorporated herein by reference.

BACKGROUND OF THE INVENTION

1. Field of the Invention

The invention relates to a folding-top drive for actuating a motor vehicle folding top.

2. Description of the Related Art

DE 102 17 784 B4 discloses a drive device for actuating an adjustable vehicle part, such as a collapsible folding top, a hinged folding-top compartment or a luggage compartment flap. The drive device disclosed in DE 102 17 784 B4 has a gearing and a drive motor that interacts with the gearing so that the gearing transmits an actuating force of the drive motor, or an actuating moment of the drive motor, to the adjustable vehicle part to be actuated. The gearing is preferably a worm gear, and accordingly a self-locking gearing. Further drive devices for actuating a motor vehicle folding top are known from DE 38 26 411 A1 and DE 101 08 769 A1.

The drive devices or folding-top drives of the prior art have enabled a folding top of a motor vehicle to open and close. However, it has been difficult to protect a folding-top drive from overloading. Such an overloading may occur for, example, if a folding top to be opened and closed abuts against an obstruction during the opening process or closing process. Such an obstruction constitutes a resistance for the folding-top drive during the opening or closing process, and the folding-top drive then attempts to move the folding top counter to the resistance. As a result, the folding-top drive and the entire folding top can be damaged. Such damage to the folding-top drive or to the entire folding top must, however, be prevented. Furthermore, it hitherto has proven difficult to manually open or close a folding top in the event of failure of the or each drive motor of a folding-top drive. Folding-top drives that permit manual actuation of a folding top have a complex design.

It is an object of the invention to provide a novel folding-top drive that addresses the problems described above.

SUMMARY OF THE INVENTION

The invention relates to a folding-top drive that comprises at least one self-locking gearing. The self-locking gearing couples the folding-top drive to a folding-top linkage of the motor vehicle folding top. The self locking gearing has first and second gearing parts. The first gearing part is actuable by a drive motor and the actuation of the first gearing part is transmissible via the second gearing part to the folding-top linkage. The first gearing part is mounted pivotably on a housing of the gearing. A guide element is provided for the first gearing part and is acted on by a spring. The guide element for the first gearing part also is mounted pivotably on the housing of the gearing. The first gearing part is guided by the guide element so that when a force or a moment on the first gearing part exceeds a defined limit value, the guide element can be moved automatically together with the first gearing part counter to the spring force of the spring from a first position, in which the first and second gearing parts are engaged, into a second position in which the first and second gearing parts are out of engagement. Additionally, when the force or the moment acting on the first gearing part falls below the defined limit value, the guide element can be moved automatically together with the first gearing part by the spring force of the spring element from the second position into the first position.

The folding-top drive of the invention is of simple construction. Additionally, the folding-top drive of the invention makes it possible with simple means to protect the folding-top drive against overloading. The or each self-locking gearing of the folding-top drive of the invention comprises at least two gearing parts. The first gearing part preferably is mounted pivotably at one end on the housing of the gearing and is guided at an opposite end on the guide element, which also is mounted pivotably on the housing of the gearing.

The folding-top drive of the invention enables both an automatic movement of the self-locking gearing from the first position, in which the first and second gearing parts are in engagement to a second position in which the first and second gearing parts are out of engagement, and also conversely an automatic movement from the second position to the first position. Hence, if the gearing has been moved from the first position into the second position for overload protection in the event of exceeding the limit value for the moment or force acting on the first gearing part, no manual access to the folding-top drive is necessary after the limit value is undershot. The restoring movement from the second position to the first position also takes place automatically when the limit value is undershot.

A stop preferably is assigned to the guide element. The stop restricts the relative movement between the first gearing part and the guide element when the guide element is moved automatically together with the first gearing part counter to the spring force of the spring from the first position to the second position. The stop assigned to the guide element simply and reliably ensures that a relative movement between the first gearing part and the guide element is restricted when the gearing is moved from the first position to the second position. There is no risk of the first gearing part passing out of engagement with the guide element when the gearing is moved from the first position to the second position.

The guide element preferably is assigned an actuating element that enables the guide element to be moved manually together with the first gearing part of the respective self-locking gearing counter to the spring force of the spring from the first position into the second position. The actuating element provides a simple emergency unlocking function. Therefore, if one or each drive motor of the folding-top drive of the invention fails, then the actuating element enables the respective self-locking gearing to be moved manually from the first position to the second position for manually opening or closing the motor vehicle folding top by eliminating the self-locking action of the gearing.

Preferred refinements of the invention will emerge from the subclaims and from the following description. An exemplary embodiment of the invention will, without being restricted thereto, be explained in more detail on the basis of the drawing.

DETAILED DESCRIPTION OF THE PREFERRED EMBODIMENT

Figure 1:
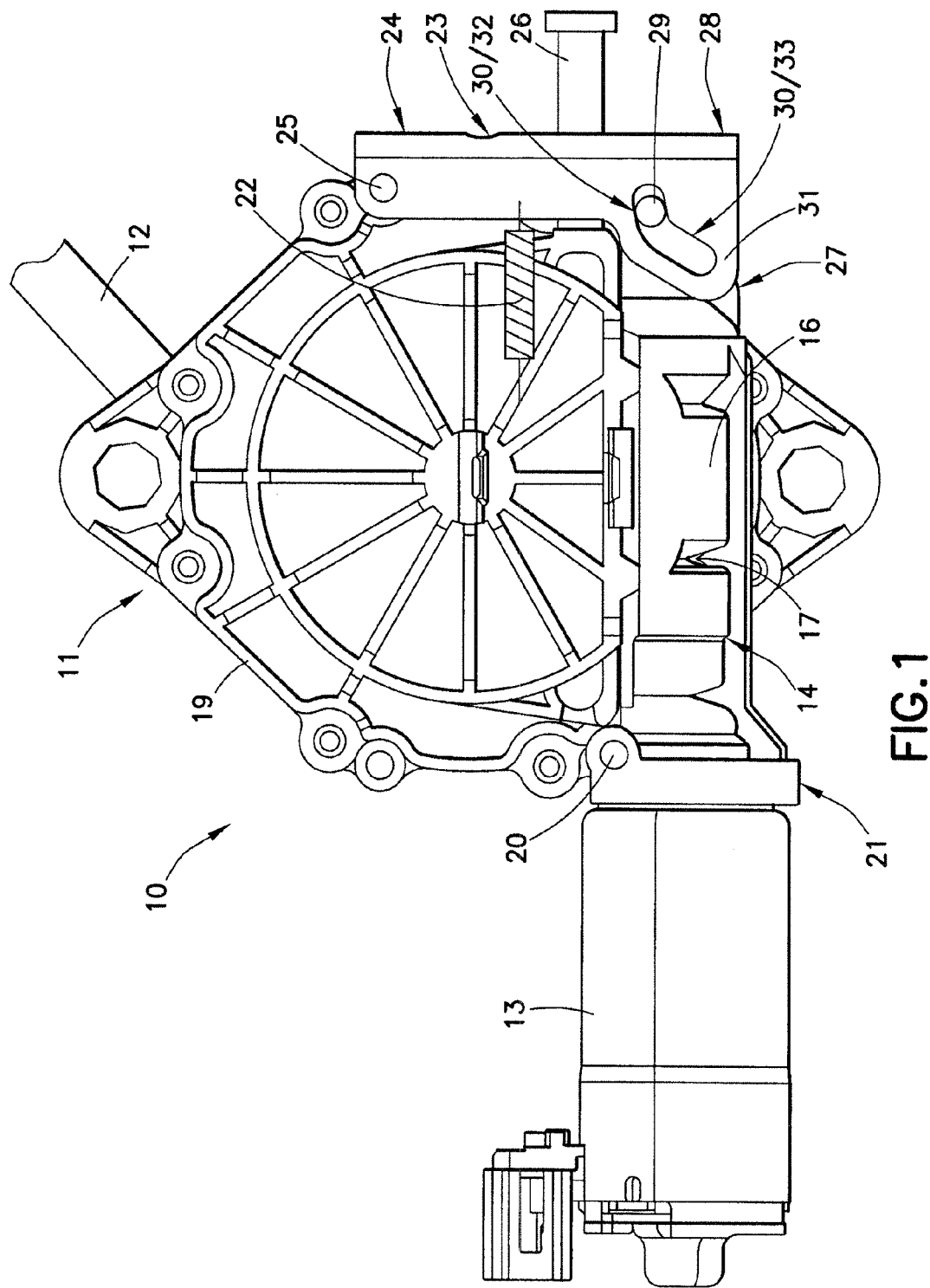
FIG. 1 is a schematic illustration of a detail of a folding-top drive according to the invention in a first state of the folding-top drive.

FIGS. 1 to 4 show different details of a folding-top drive 10 according to the invention. The folding-top drive 10 has, at each side of the motor vehicle folding top to be actuated, one gearing 11 via which the folding-top drive 10 can be coupled or attached to a folding-top linkage 12 of the motor vehicle folding top. In the preferred illustrated embodiment, in each case one drive motor 13 interacts with each gearing 11. However, it is also possible for both gearings 11 to be assigned a common drive motor, which then acts on both gearings 11 via a driveshaft.

Each gearing 11 is designed as a self-locking gearing, specifically in the exemplary embodiment shown as a worm gearing. A further, non-self locking gearing such as a planetary gear set may be connected between the respective self-locking worm gearing 11 and the folding-top linkage 12.

Figure 5:
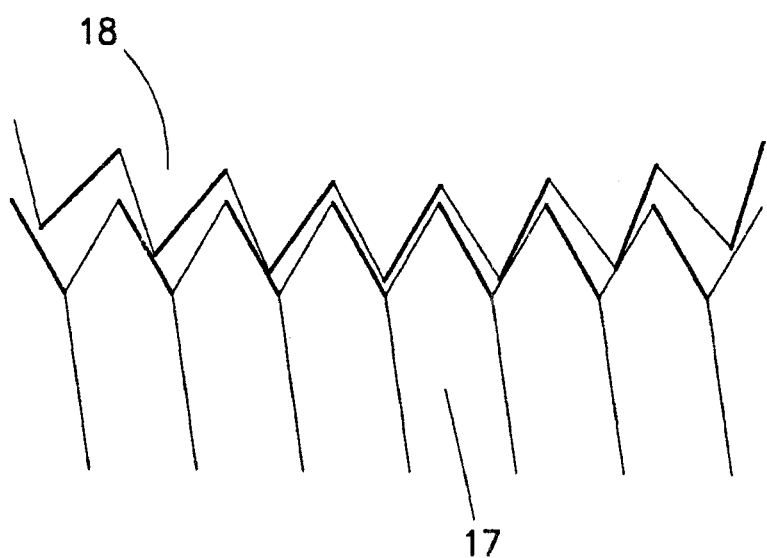
FIG. 5 shows the detail V of FIG. 4.

Each self-locking gearing 11 has first and second gearing parts 14 and 15. In the case of a worm gearing, the first gearing part 14 of the respective gearing 11 has a worm housing 16 and a worm 17 held in the worm housing 16. The second gearing part 15 has a worm gear 18 that interacts with the worm 17 of the first gearing part 14. The worm 17 and the worm gear 18 are shown in more detail in FIGS. 4 and 5.

The first gearing part 14 of each self-locking gearing 11 is mounted pivotably on a housing 19 of the respective gearing 11. FIG. 1 shows that the worm housing 16 of the first gearing part 14 is mounted on the housing 19 of the gearing 11 so as to be pivotable about a first joint 20. Thus, the worm 17 held in the worm housing 16 and the drive motor 13 that acts on the worm 17 also are pivotable with the worm housing 16 about the first joint 20. The joint 20 is in proximity to a first end 21 of the first gearing part 14 and therefore, in the illustrated embodiment, to a first end 21 of the worm housing 16.

As an alternate to the illustrated embodiment, the drive motor 13 may be stationary and a flexible shaft may be arranged between the drive motor 13 and first gearing part 14. Thus, the first gearing part 14 of the alternate embodiment (e.g. the worm housing 16 and the worm 17) can be pivoted relative to the stationary drive motor 13 about the joint 20.

A guide element 23 also is mounted pivotably on the housing 19 of the respective gearing 11. The guide element 23 is acted on by a spring 22 for the first gearing part 14 for the worm housing 16. A first end 24 of the guide element 23 for the first gearing part 14 is mounted on the housing 19 so as to be pivotable about a second joint 25.

The first gearing part 14, which is mounted on the housing 19 of the respective gearing 11 to be pivot about the joint 20, interacts with the guide element 23, which is mounted on the housing 19 of the respective gearing 11 to pivot about the joint 25.

The first gearing part 14 and the guide element 23 interact in such a way that the first gearing part 14 is guided on the guide element 23. More particularly, when a force or moment on the first gearing part 14 exceeds a limit value, the guide element 23 can be moved automatically together with the first gearing part 14 counter to the spring force provided by the spring from the position shown in FIG. 1, in which the first and second gearing parts 14 and 15 are engaged, into the position shown in FIG. 2, in which the first and second gearing parts 14 and 15 of the respective gearing 11 are not engaged.

Figure 2:
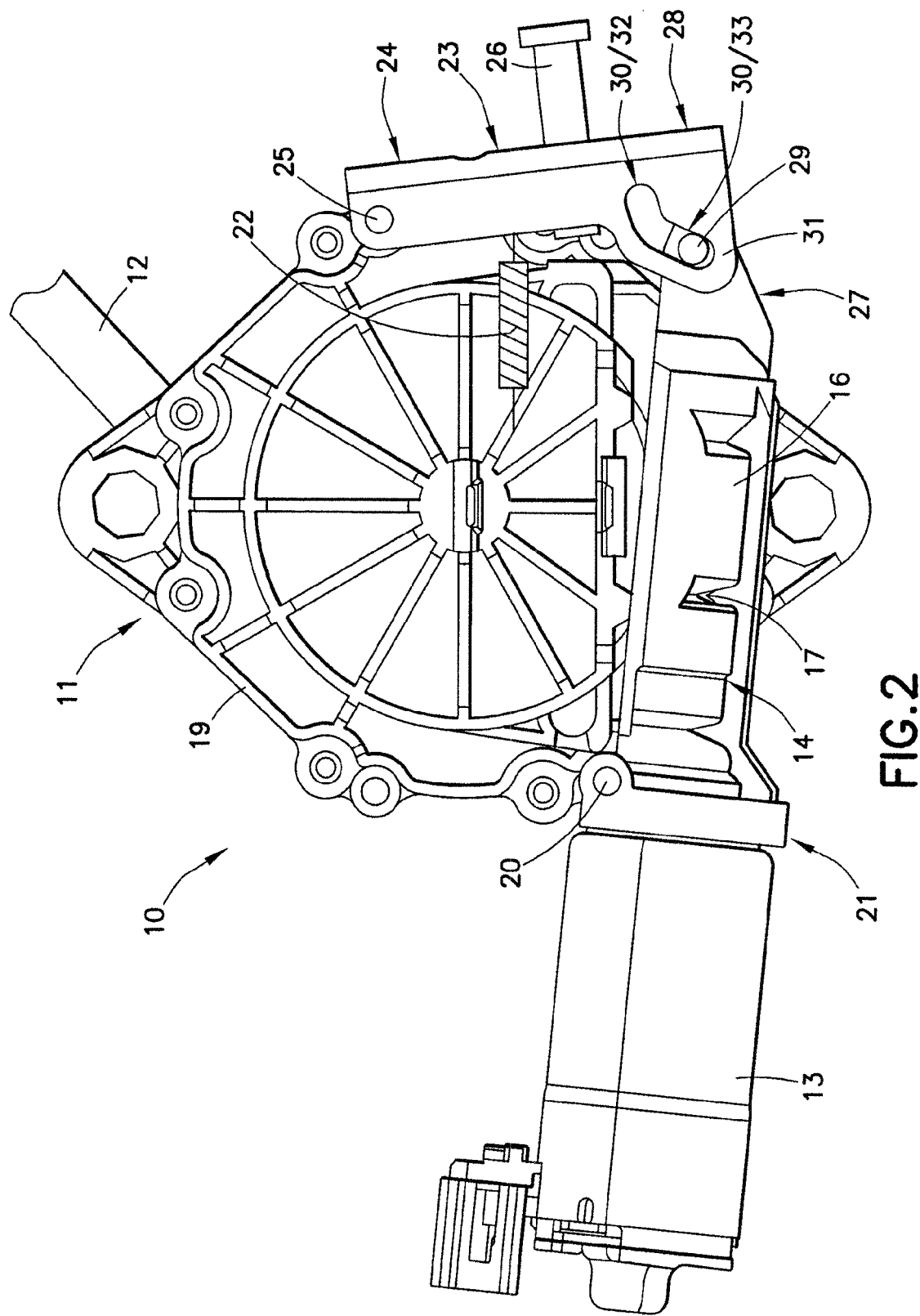
FIG. 2 shows the detail of FIG. 1 in a second state of the folding-top drive.

Similarly, when the force or moment acting on the first gearing part 14 of the respective gearing 11 falls below the defined limit value, the spring force of the spring element 22 automatically moves the guide element 23 together with the first gearing part 14 of the respective gearing 11 from the position shown in FIG. 2 into the position shown in FIG. 1.

As noted above, the first gearing part 14 of the respective self-locking gearing 11 is mounted on the housing 19 of the gearing 11 so as to be pivotable about the first joint 20, and first joint 20 is in proximity to the first end 21 of the first gearing part 14. The guide element 23 is mounted on the housing 19 of the respective self-locking gearing 11 so as to be pivotable about the joint 25, and the joint 25 is in proximity to the first end 24 of the guide element 23.

Figure 3:
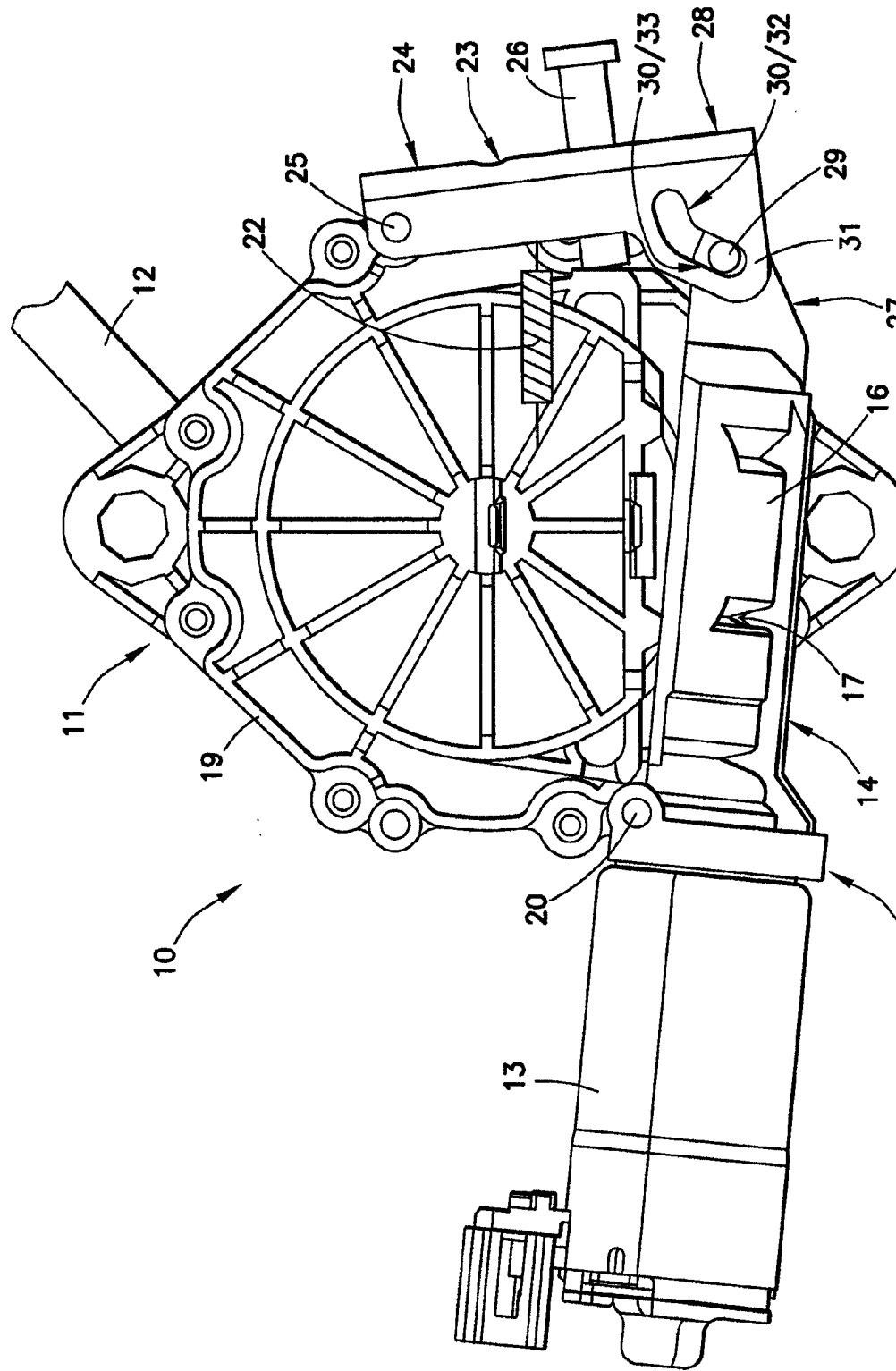
FIG. 3 shows the detail of FIG. 1 in a third state of the folding-top drive.
Figure 4:
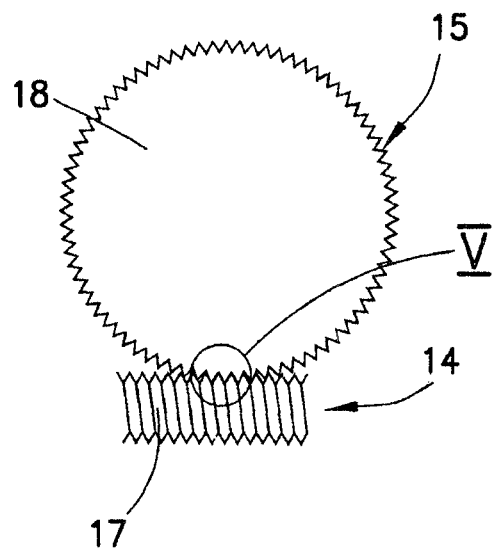
FIG. 4 shows a further detail of the folding-top drive according to the invention.

The first gearing part 14 has a second end 27 opposite the first end 21 thereof, and the guide element 23 has a second end 28 opposite the first end 24 thereof. The second end 27 of the first gearing part 14 is guided on the second end 28 of the guide element 23. More particularly, a guide pin 29 at the second end 27 of the first gearing part 14 is guided in a slotted guide 30 in proximity the second end 28 of the guide element 29. As shown in FIGS. 1 to 3, the slotted guide 30 has two angularly aligned sections 32, 33.

The guide pin 29 is guided in the upper, relatively flat section 32 of the slotted guide 30 when the gearing 11 or the gearing parts 14 and 15 thereof assume the first position (FIG. 1). In contrast, the guide pin 29 is in the lower relatively steep section 33 of the slotted guide 30 when the two gearing parts 14 and 15 of the gearing 11 are moved relative to one another into the second position (FIGS. 2, 3).

The slotted guide of the guide element 29 alternatively may be designed to run straight with a single obliquely running section that has no bend.

A stop 31 is associated with the second end 28 of the guide element 23 on which the first gearing part 14 of the respective self-locking gearing 11 is guided. In the illustrated embodiment, the lower relatively steep section 33 of the slotted guide 30 is closed so that the portion of the guide element 23 at the closed lower section 33 of the slotted guide 30 forms the stop 31.

The stop 31 ensures that relative movement between the first gearing part 14 and the guide element 23 is restricted when the first guide element 23 is moved together with the first gearing part 14 of the respective self-locking gearing 11 counter to the force of the spring 22 from the first position to the second position. Thus, the first gearing part 14 is always in engagement with the guide element 23.

In the illustrated embodiment, the stop 31 holds the guide pin 29 in the slotted guide 30 at all times, and accordingly the guide pin 29 of the first gearing part 14 can never be moved out of the slotted guide 13 of the guide element 23.

The joint 20 could have a rotational angle delimiting means on the housing 19 instead of having the stop 31. such a rotational angle delimiting means would restrict relative movement between the first gearing part 14 and the guide element 23, and would ensure that the first gearing part 14 would always remain engaged with the guide element 23.

The limit value for the force or moment acting on the first gearing part 14 is selected to exceed a maximum drive force of the respective drive motor 13 required for a regular opening or closing of the motor vehicle folding top. This takes place by coordinating the design of the spring 22 and the slotted guide 30. Influential factors on the limit value are: the spring constant of the spring 22; and the angle of the slotted guide 30 with respect to the tangent of a pivoting radius about the joint 20, regardless of whether the slotted guide 30 has two angled sections 32, 33 or a single straight-running slot.

The limit value for the force or moment acting on the first gearing part 14 preferably is selected so as not to be exceeded when a folding top that is to be opened or closed by the folding-top drive 10 abuts against a stop and no additional force is exerted on the folding top counter to the opening or closing movement. In this case, the two gearing parts 14, 15 of the respective self-locking gearing 11 then remain engaged and the drive motor 13 simply comes to a standstill but continues to be supplied with current, but eventually is deactivated to prevent overheating.

The limit value is exceeded only when an additional force is exerted on the folding top counter to the opening or closing movement. In this case, the two gearing parts 14, 15 of the respective self-locking gearing 11 then pass out of engagement. This occurs, for example, if the folding top to be opened or closed is actuated while the vehicle is driving and the folding top impacts against an obstruction, or if pressure inadvertently is applied to the moving folding top when the vehicle is at a standstill.

The spring 22 may be an extension spring. One end of the extension spring 22 engages on the housing 19 and the other end engages on the guide element 23. Thus, the spring 22 pulls the guide element 23 into the position shown in FIG. 1 with the two gearing parts 14 and 15 of the self-locking gearing 11 engaged.

The spring 22 may alternatively be a leg spring or some other spring. A leg spring may be arranged around the joint 25.

The above-described design of the folding-top drive 10 simply and reliably provides overload protection for the folding-top drive 10 both in the event of exceeding the limit value for overload protection and also in the event of undershooting the limit value and automatically places the two gearing parts 14 and 15 of the respective self-locking gearing 11 into engagement or out of engagement. Thus, manual access to the folding-top drive 10 is not required to implement or cancel overload protection.

The guide element 23 may have an actuating element 26 that is used if the drive motor 13 fails. The actuating element 26 enables the guide element 23 to be moved manually together with the first gearing part 14 of the respective self-locking gearing 11 counter to the spring force of the spring element 22 from the position shown in FIG. 1 into the second position shown in FIG. 3. The two gearing parts 14 and 15 of the self-locking gearing 11 are not engaged with one another in the second position, so as to eliminate the self-locking action of the gearing 11.

The stop 31 restricts displacement of the guide element 23 relative to the first gearing part 14 during the displacement of the two gearing parts 14 and 15 of the respective self-locking gearing 11 relative to one another, including displacement that is initiated manually via the actuating element 26. Thus, even if the self-locking of the gearing 11 is overcome manually, there is no risk of the first gearing part 14 passing out of engagement with the guide element 23.

In the illustrated embodiment, the actuating element 26 is an actuating screw with an external thread that is guided in a recess of the guide element 23 that has an internal thread.

The actuating element or screw 26 is moved manually further in the direction of the housing 19 to manually overcome the self-locking of the gearing 11. Thus, the actuating screw 26 is supported rotatably in the guide element 23 with an end of the actuating screw 26 engaged against the housing 19. Thus, progressive rotation of the actuating screw 26 pivots the guide element 23 about the joint 25. Accordingly, the guide pin 29 of the first gearing part 14 in the slotted guide 30 of the guide element 23 passes into the lower, relatively steeply running section of the slotted guide 30, and the two gearing parts 14 and 15 of the respective self-locking gearing 11 are placed out of engagement to eliminate the self-locking action of said gearing 11.

What is claimed is:

1. A folding-top drive for actuating a folding top linkage of a motor vehicle, comprising: at least one self-locking gearing coupling the folding-top drive to the folding-top linkage of the motor vehicle, the self-locking gearing having a housing and first and second gearing parts; a drive motor for actuating the first gearing part, actuation of the first gearing part being transmitted to the second gearing part and then to the folding-top linkage; the first gearing part of the respective gearing being pivotably mounted on the housing of the gearing at a first joint; a guide element pivotably mounted on the housing of the gearing at a second joint spaced from the first joint, the guide element being acted on by a spring; the first gearing part of the gearing being slidably and pivotably guided on the guide element so that, when a force or moment acting on the first gearing part exceeds a defined limit value, the first gearing part and the guide element automatically pivot about the first and second joints and slidably and pivotably move relative to one another counter to the spring force of the spring from a first position, in which the first and second gearing parts of the gearing are engaged, into a second position in which the first and second gearing parts of the gearing are disengaged, and so that, when the force or moment acting on the first gearing part of the gearing falls below the defined limit value, the first gearing part and the guide element automatically pivot about the first and second joints and pivot and slidslide relative to one another by the spring force of the spring from the second position into the first position.

2. The folding-top drive of claim 1, wherein the first gearing part of the respective gearing comprises at least one worm housing and a worm held therein.

3. The folding-top drive of claim 2, wherein the second gearing part of the respective gearing comprises at least one worm gear that interacts with the worm of the first gearing part.

4. The folding-top drive of claim 3, wherein the first gearing part of the respective gearing has opposite first and second ends and the guide element has opposite first and second ends, the first end of the first gearing part of the respective gearing being mounted on the housing of the gearing so as to be pivotable about the first joint, and the first end of the guide element being mounted on the housing of the gearing so as to be pivotable about the second joint, and the second end of the first gearing part being slidably and pivotably guided on the second end of the guide element.

5. The folding-top drive of claim 4, wherein the guide element has a stop that restricts relative movement between the first gearing part and the guide element when the guide element is moved together with the first gearing part of the respective gearing counter to the spring force of the spring element from the first position into the second position.

6. The folding-top drive of claim 5, wherein the guide element has a slotted guide and the stop being adjacent the slotted guide, the first gearing part of the respective gearing having a guide pin that is guided in the slotted guide of the guide element, the stop holding the guide pin of the first gearing part in the slotted guide of the guide element when the guide element is moved together with the first gearing part of the respective gearing counter to the spring force of the spring from the first position into the second position.

7. The folding-top drive of claim 6, wherein the slotted guide has sections that are angled relative to one another.

8. The folding-top drive of claim 1, further comprising an actuating element for manually moving the guide element together with the first gearing part of the respective gearing counter to the spring force of the spring element from the first position into the second position.

9. The folding-top drive of claim 8, wherein the actuating element is an actuating screw having an external thread guided in an internally threaded recess of the guide element.

10. A folding-top drive for actuating a motor vehicle folding top linkage, comprising: a gearing housing; a worm gear in the gearing housing; a worm housing having opposite first and second ends, the first end of the worm housing being pivotally mounted to the gearing housing; a worm rotatably mounted in the worm housing and being in self-locking engagement with the worm gear when the worm housing is pivoted into an engagement position; a drive motor for driving the worm, which in turn drives the worm gear, which then moves the motor vehicle folding top linkage;

a guide having opposite first and second ends, the first end of the guide being pivotably mounted on the clearing housing, the second end of the guide being slidably and pivotably engaged with the second end of the worm housing; a spring mounted to the guide for urging the guide into a position where the slidable and pivotable engagement of the second end of the guide with the second end of the worm housing urges the worm housing toward the engagement position, whereby when a force acting on the worm exceeds a defined limit value, the guide is moved together with the worm housing counter to a force of the spring away from the engagement position and when the force or moment acting on the worm falls below the defined limit value the spring urges the worm housing to the engagement position.

11. The folding-top drive of claim 10, wherein the guide has a stop that restricts relative movement between the worm housing and the guide when the guide is moved together with the worm housing counter to the force of the spring away from the engagement position.

12. The folding-top drive of claim 11, wherein the guide has a slot and the stop being adjacent the slot, the worm housing having a guide pin that is guided in the slot of the guide, the stop holding the guide pin of the worm housing in the slot of the guide when the guide is moved together with the worm housing counter to the force of the spring away from the engagement position.

13. The folding-top drive of claim 10, further comprising an actuating element for manually moving the guide together with the worm housing counter to the force of the spring away from the engagement position.

* * * * *